United States Patent
Zhang et al.

(10) Patent No.: US 8,208,219 B2
(45) Date of Patent: Jun. 26, 2012

(54) MODIFIED FIELD GENERATION LAYER FOR MICROWAVE ASSISTED MAGNETIC RECORDING

(75) Inventors: Kunliang Zhang, Fremont, CA (US); Min Li, Dublin, CA (US); Yuchen Zhou, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 68 days.

(21) Appl. No.: 12/927,083

(22) Filed: Nov. 5, 2010

(65) Prior Publication Data
US 2012/0113540 A1 May 10, 2012

(51) Int. Cl.
*G11B 5/127* (2006.01)
(52) U.S. Cl. .................. 360/125.03; 360/125.3
(58) Field of Classification Search .............. 360/324.1, 360/324.11, 324.12, 324.2, 125.03, 125.3
See application file for complete search history.

(56) References Cited

U.S. PATENT DOCUMENTS

| | | | |
|---|---|---|---|
| 7,352,658 B2 | 4/2008 | Shimazaki et al. | |
| 7,473,478 B2 * | 1/2009 | Sbiaa et al. | 428/693.1 |
| 7,616,412 B2 | 11/2009 | Zhu et al. | |
| 7,633,699 B2 * | 12/2009 | Kaka et al. | 360/67 |
| 2008/0112087 A1 * | 5/2008 | Clinton et al. | 360/317 |
| 2009/0257151 A1 | 10/2009 | Zhang et al. | |
| 2010/0034017 A1 * | 2/2010 | Rivkin et al. | 365/171 |
| 2010/0128377 A1 | 5/2010 | Zhou et al. | |
| 2010/0142088 A1 * | 6/2010 | Iwasaki et al. | 360/110 |
| 2011/0038081 A1 * | 2/2011 | Contreras et al. | 360/125.03 |
| 2011/0134561 A1 * | 6/2011 | Smith et al. | 360/59 |
| 2011/0216447 A1 * | 9/2011 | Li et al. | 360/313 |
| 2011/0255197 A1 * | 10/2011 | Tsuchiya et al. | 360/245.3 |

OTHER PUBLICATIONS

"Microwave Assisted Magnetic Recording," by Jian-Gang Zhu et al., IEEE Transactions on Magnetics, vol. 44, No. 1, Jan. 2008, pp. 125-131.
"Current-driven excitation of magnetic multilayers," by J.C. Slonczewski, Journal of Magnetism and Magnetic Materials 159 (1996) L1-L7, Elsevier.
Co-pending US Patent HT09-037, U.S. Appl. No. 12/800,196, filed May 11, 2010, "CoFe/Ni Multilayer Film with Perpendicular Anisotropy for Microwave Assisted Magnetic Recording," assigned to the same assignee as the present invention, 41 pgs.

* cited by examiner

*Primary Examiner* — Jefferson Evans
(74) *Attorney, Agent, or Firm* — Saile Ackerman LLC; Stephen B. Ackerman

(57) ABSTRACT

A spin torque oscillator is described in which the conventional Field Generation Layer (FGL) is replaced by a bilayer, one of whose members exhibits perpendicular magnetic anisotropy while the other exhibits conventional in-plane anisotropy. Provided the layer with the perpendicular anisotropy is the one that is closest to the spacer layer, the device is able to generate microwaves at current densities as low as $1 \times 10^8$ A/cm$^2$.

19 Claims, 5 Drawing Sheets

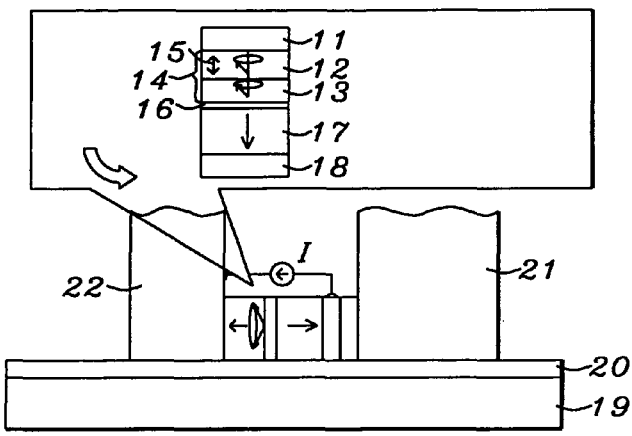
FIG. 1 – Prior Art
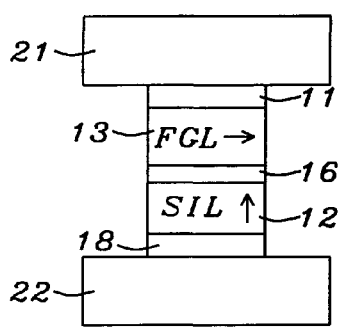
FIG. 2a
Prior Art
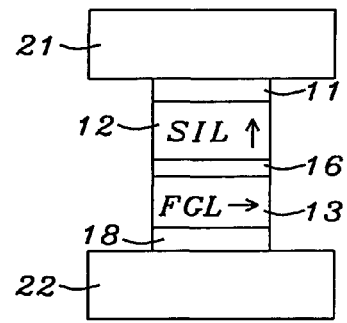
FIG. 2b
Prior Art
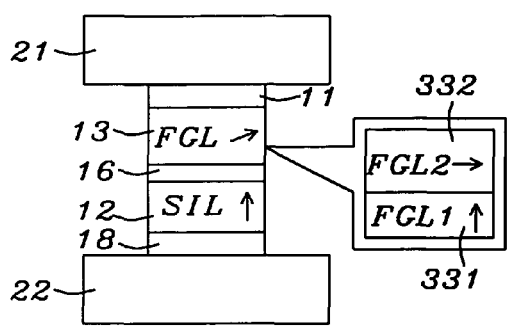
FIG. 3a
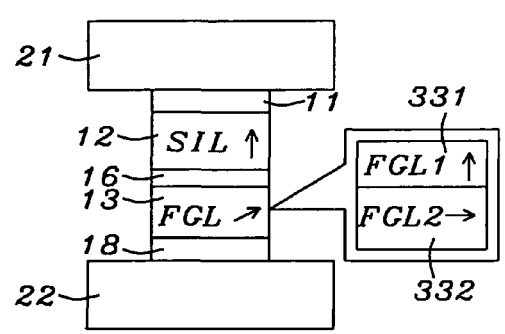
FIG. 3b

MODIFIED FIELD GENERATION LAYER FOR MICROWAVE ASSISTED MAGNETIC RECORDING

FIELD OF THE INVENTION

The invention relates to the general field of microwave assisted magnetic recording with particular reference to the design of the field generator portion of the spin torque oscillator.

BACKGROUND OF THE INVENTION

Microwave assisted magnetic recording, MAMR, is one of several future technologies that are expected to extend perpendicular magnetic recording beyond 1 terabit per square inch. In this scheme, a field generator is placed in close proximity to the write element to produce a high frequency oscillating field in the media film plane. The frequency range of the oscillating field could be from 5 GHz to 50 GHz. Because of ferromagnetic resonance (FMR), it becomes possible to switch media grains at fields below their normal coercivity i.e. a lower write field may be used, but only in the immediate vicinity of the microwave assisted write element.

A microwave field generator is basically a spin torque oscillator (STO). It resembles a current-perpendicular-to-plane (CPP) GMR or TMR structure in that the current flows perpendicular to the film, passing through a spacer layer into a reference layer. The magnetization directions in the stack are, however, different from those of a CPP GMR/TMR sensor.

As schematically illustrated in the top section of FIG. 1, the simplest configuration for a STO is a tri-layer stack consisting of a spin injection layer (SIL) 12, non-magnetic spacer 16 (metallic or insulating), and field generating layer (FGL) 13. The SIL magnetization must be kept perpendicular to the plane of the film, either by an external magnetic field or through its intrinsic perpendicular magnetic anisotropy (PMA). As electrons in oscillating stack 14 transit SIL 12 their spins become polarized by the magnetization present in SIL 12. The degree of spin polarization is further enhanced by the greater probability of electrons, whose magnetization is in the same direction as reference layer 17, being able to transit spacer 16. Spin torque oscillation then occurs in the FGL 13, resulting in the generation of microwaves.

The lower section of FIG. 1 shows how the STO is positioned as part of a perpendicular magnetic write head for use in MAMR. The STO (rotated 90° relative to its orientation in the upper section of FIG. 1) is positioned with its top electrode 11 up against main pole 22 and it bottom electrode 18 up against trailing shield 21. When data is to be written, microwaves emerging from the STO illuminate recording medium layer 20 (seen above soft magnetic underlayer 19) just ahead of main pole 22.

A paper by C. Slonczewski [1] on spin-transfer torque (STT) magnetization switching has attracted considerable interest due to its potential application to spintronic devices such as STT-MRAM on a gigabit scale. Recently, J-G. Zhu et al. [2] described another spintronic device called a spin transfer oscillator where a spin transfer momentum effect is relied upon to enable recording at a head field significantly below the medium coercivity in a perpendicular recording geometry. See FIG. 1 above.

In two recent patent applications by Headway [3] [4], it was shown that a large perpendicular magnetic anisotropy (PMA) can be established in both the [Co/Ni]xn and [CoFe/Ni]xn multilayer systems by using a seed layer of Ta/Ru/Cu in combination with a relatively low total thickness. Thus an effective MAMR device can be fabricated with these [Co/Ni] and/or [CoFe/Ni]xn multilayer PMA systems.

Furthermore, it was shown that the performance of FGLs such as FeCo, FeCoAl, etc can be improved by inserting a magnetic layer such as a [Co/Ni]xn multilayer or a [CoFe/Ni] xn multilayer having PMA. However, these patent applications do not cover all possible schemes for the top STO case. The present invention discloses particular STO structures that utilize [Co(Fe)/Ni] multilayer PMA coupling with a high saturation magnetization (Ms) material such as FeCo to form the FGL.

[1] C. Slonczewski, "Current driven excitation of magnetic multilayers", J. Magn. Magn. Mater. V 159, L1-L7 (1996)
[2] J. Zhu et al, "Microwave Assisted Magnetic Recording", IEEE. Trans. Magn. 44, 125 (2008)
[3] K. Zhang, et. al. Headway application Ser. No. 12/456,621
[4] K. Zhang, et. al. Headway application Ser. No. 12/800,196

A routine search of the prior art was performed with the following references of interest being found:

U.S. Pat. No. 7,616,412 (Zhu et al) discloses a reference stack comprising both perpendicular and in-plane components for microwave assisted magnetic recording while U.S. Pat. No. 7,352,658 (Shimazaki et al) shows a first magnetic film having perpendicular anisotropy and a second magnetic film having either perpendicular or in-plane anisotropy.

In regard to U.S. Pat. No. 7,616,412 (Zhu et al.), this invention proposes to cover a reference layer system with a weaker perpendicular magnetic anisotropy (PMA). An example would be a system with both in-plane and out-of-plane anisotropies, but with the out-of-plane anisotropy being greater than the in-plane anisotropy, thereby tilting the magnetization partially out of the plane. As will become apparent below, this teaches away from the present invention where the in-plane and out-of-plane anisotropies are in different layers. Zhu et al. speculate that, even when the anisotropy is partially tilted in-plane, they can still have adequate signal readout without a sensor because of the in-plane component of the anisotropy. This suggests that without tilting, the readout would be zero because both the oscillating and the reference layers are parallel to each other (CPP GMR=0).

SUMMARY OF THE INVENTION

It has been an object of at least one embodiment of the present invention to provide a spin torque oscillator that generates microwaves at low current densities Another object of at least one embodiment of the present invention to provide a method to enable a spin torque oscillator (STO) to generate microwaves at low current densities Still another object of at least one embodiment of the present invention has been for said spin torque oscillator to be suitable for use in Microwave Assisted Magnetic Recording A further object of at least one embodiment of the present invention has been for manufacture of said spin torque oscillator to be fully compatible with current methods for manufacturing such devices.

These objects have been achieved by replacing the conventional Field Generation Layer (FGL) with a bilayer—FGL1 and FGL2. FGL1 is characterized by having an easy axis that is normal to the spacer (i.e. it exhibits PMA) while FGL2 has its easy axis parallel to the spacer layer. (i.e. it exhibits conventional in-plane anisotropy).

Since FGL1 and FGL2 are strongly exchange coupled to each other, they will be excited simultaneously to oscillate as though they were a single layer.

A critical requirement of the invention is that, regardless of whether the device's spin injection layer (SIL) is above or below the spacer layer, FGL1 (which has the PMA) must be closer to the spacer than FGL2 (which has the in-plane anisotropy).

BRIEF DESCRIPTION OF THE DRAWINGS

FIG. 1. Prior art MAMR device.

FIGS. 2a and 2b show prior art MAMR structures with SIL at bottom and top, respectively.

FIGS. 3a and 3b show invented structures that correspond to FIGS. 2a and 2b, respectively.

DESCRIPTION OF THE PREFERRED EMBODIMENTS

Figure 4A:
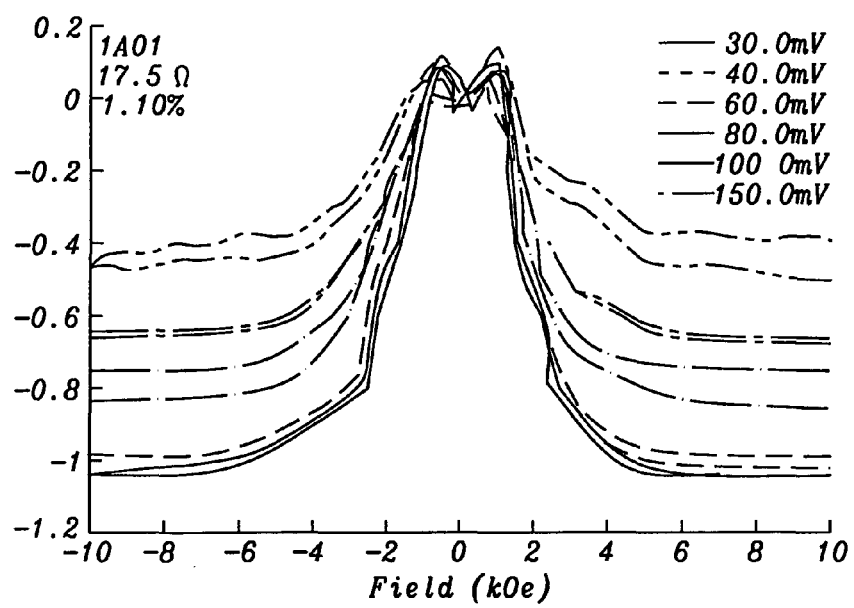
FIGS. 4a through 4d show experimental results for STO testchip (TC) wafers with the partial anisotropy FGL.

In order for a MAMR device to work, the FGL layer is required to generate a large high frequency magnetic field (Hac) typically in association with the highest saturation magnetization (Bs) of the FGL material. However, once Bs gets too high, the critical current density also become very large, thereby raising serious reliability concerns.

The Slonczewski model discussed earlier suggests that once the FGL layer has a PMA or partial PMA, the critical current density for spin transfer could be greatly reduced. The present invention discloses how the PMA of the [CoFe/Ni] multilayer system can be utilized to induce partial PMA in a high Bs FGL material such as FeCo through exchange coupling. Doing so, i.e. having a high moment FGL material with partial PMA, greatly facilitates the onset of FGL oscillation.

Referring now to FIGS. 2a and 2b, shown there are two prior art structures in which SIL layers 12 are located at the bottom and at the top, respectively. Also seen are spacer 16 and FGL 13.

The invented structures shown in FIGS. 3a and 3b also have their SIL layers at the bottom and top, respectively, but FGL 13 in each case can be seen to now be made up two sub-layers, 331 and 332, rather than being a single uniform layer.

For both FIGS. 3a and 3b, FGL sub layer 331 is the closest to spacer 16 and is characterized by having an easy axis that is normal to the spacer's two opposing surfaces (i.e. it exhibits conventional PMA) while FGL sub-layer 332 has its easy axis parallel to spacer 16 (i.e. it exhibits in-plane anisotropy). Since FGL sub-layers 331 and 332 are strongly exchange coupled to each other, they will be excited simultaneously so composite FGL layer 33 will oscillate as a single layer.

The benefit of having high PMA FGL 331 (such as a [Co(Fe)/Ni]xn or [Co(Fe)/Pt]xn) in direct contact with the high Bs FGL 332 material (such as FeCo or FeCoAl etc.) will be discussed further below. For the invented STO to work, the FGL layer has to be excited through spin torque exerted by reflected spin polarized electrons from the SIL. So, if FGL 331 is given a high PMA, the reflected polarized electrons from the SIL can easily excite it since SIL 12 and FGL 331 are now magnetized in the same direction, thereby greatly reducing the energy barrier between them.

Once FGL 331 is excited, the spin torque acting thereon will rapidly propagate into FGL 332 causing it to oscillate. In other words, FGL 331 can be thought of as acting as a spin torque ignition layer. The spin torque that originates in the SIL and the FGL will add up, since they are in the same direction, and will thereby enhance the FGL 332 oscillations. Additionally, electrons from FGL 332 will also help FGL 331 to oscillate in plane, thereby causing it to oscillate even more vigorously.

Similar mechanisms apply to FIG. 3b, the top STO case where SIL 21 is located on top of the FGL and where FGL 331 has a high PMA. In this case, the PMA layer has been placed on top of the in-plane magnetic anisotropy layer.

It is important to note that if the order of the FGL sub-layers is switched, for example if FGL 331 is inserted on top of FGL 332 (through modification of FIG. 3a) or FGL 331 is inserted below FGL 332 layer (through modification of FIG. 3b), the STO oscillator will not operate efficiently because the spin torque of the reflected electrons from the SIL and the spin torque of the electrons in FGL 331 now act in opposite directions, resulting in their mutual cancellation. Another example of incorrect insertion of a partial anisotropy FGL can also be seen in prior art FIG. 1

In summary, for both the bottom SIL and top SIL cases, the FGL sub-layer that has a PMA structure needs to be the one in immediate contact with the spacer layer. When that is the case, STO oscillations can be generated at current densities as low as $1 \times 10^8$ A/cm².

EXAMPLES

For evaluation as a preferred embodiment, a bottom SIL structure was fabricated in the following configurations. Each value next to an individual layer indicates that film's thickness in Angstroms.

Example 1

On Top [CoFe/Ni]xm Coupled with FeCo as FGL) at Bottom ([CoFe/Ni]xn

Ta10/Ru20/Cu20/[CoFe(x %)2/Ni6]xn/spacer/
[CoFe(x %)2/Ni6]xm/FeCo100/Ru10/Ta4
0/Ru30

In the above structure, Ta10/Ru20/Cu20 is used as a composite seed layer, [CoFe(x %)2/Ni5]xn multilayer structure as a reference layer, with x % ranging from 0% (pure Co/Ni case) to 90% for CoFe(x %) compositions and n ranging from 5 to 50 with a preferred range from 10 to 30 laminations; the spacer material can be Cu for CPP-GMR or MgO, AlOx, TiOx, ZnO for TMR. FeCo layer of 50 Å to 300 Å is served as the FGL layer. Finally, Ru10/Ta40/Ru30 is used as the capping layer.

The annealing temperature for such devices can be from 150 to 300° C. with a preferred range of 180 to 250° C. and annealing can be from 0.5 hours to 5 hours. In particular, [CoFe(x %)2/Ni5]xm (with m ranging from 5 to 30 with a preferred range of from 5 to 20) is inserted underneath the FeCo100 layer; since the [CoFe/Ni]xm layer is strongly magnetically coupled with the FeCo layer, the strong PMA of the [CoFe(x %)2/Ni5]xm will force the anisotropy of the FeCo to tilt partially toward the perpendicular direction thereby enabling the full FGL to oscillate at a current density as low as $1 \times 10^8$ A/cm².

Note that in U.S. Pat. No. 7,616,412 (Zhu et al.) the PMA layer has the opposite sign of the PMA. This is a fundamental difference as it implies a totally different spin torque contribution that is of no value in the present context (even if it were manufacturable).

Shown in FIGS. 4a-4d are experimental results for a device built with the following specific dimensions:

Ta10/Ru20/Cu20/[Co(50%)Fe2/Ni5]x15/Cu20/[Co(50%)Fe2/Ni5]x10/Fe(70%)Co100/Ru10/Ta40/Ru30

Figure 4B:
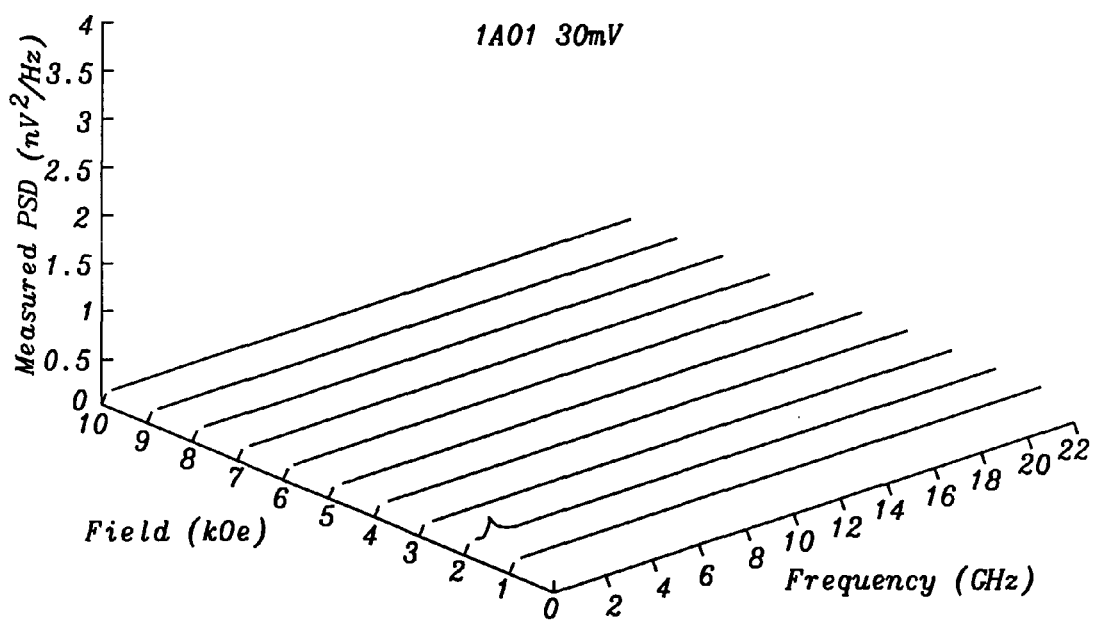
Figure 4C:
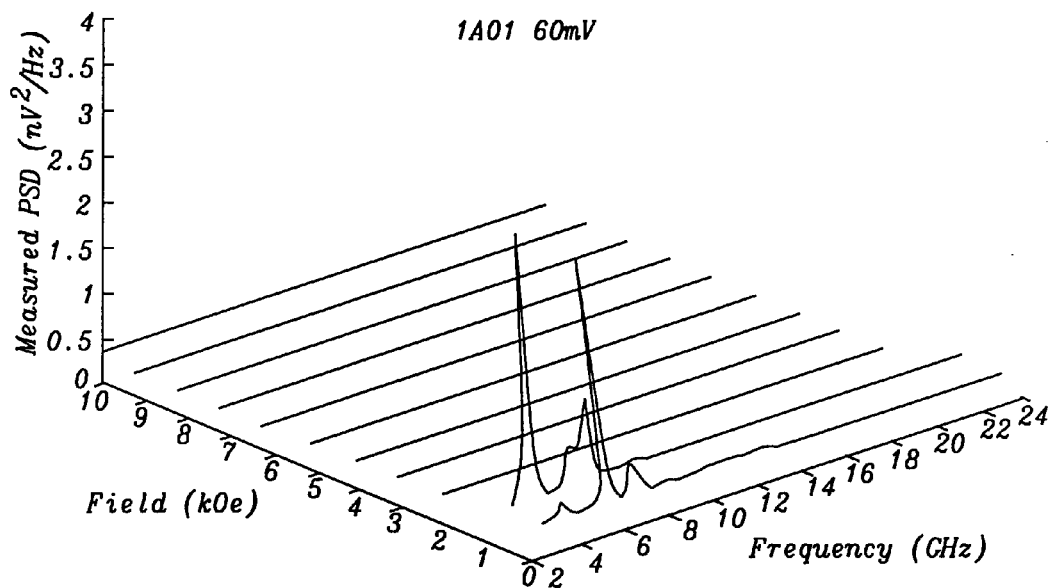
Figure 4D:
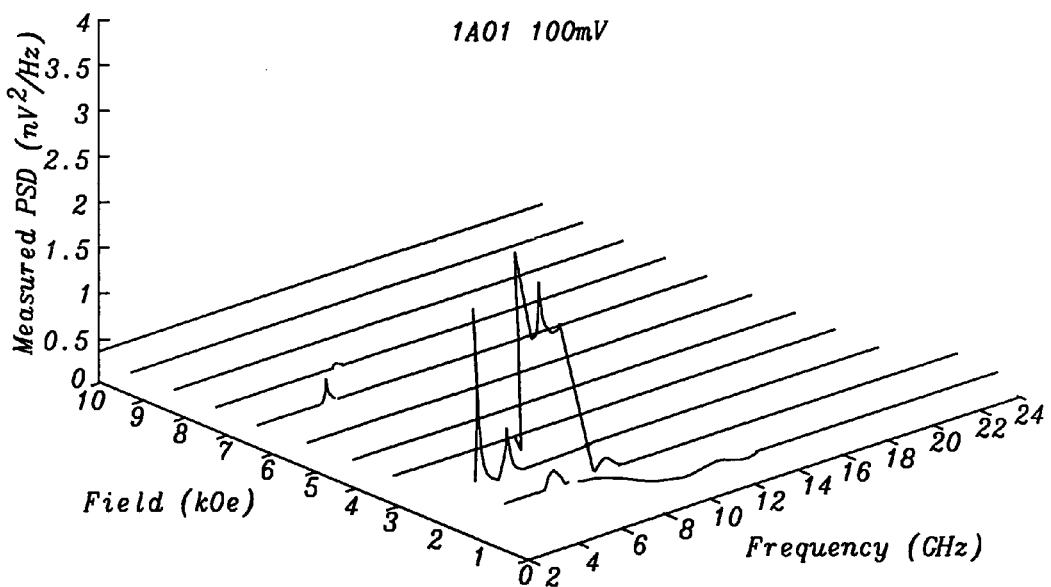
Figure 5A:
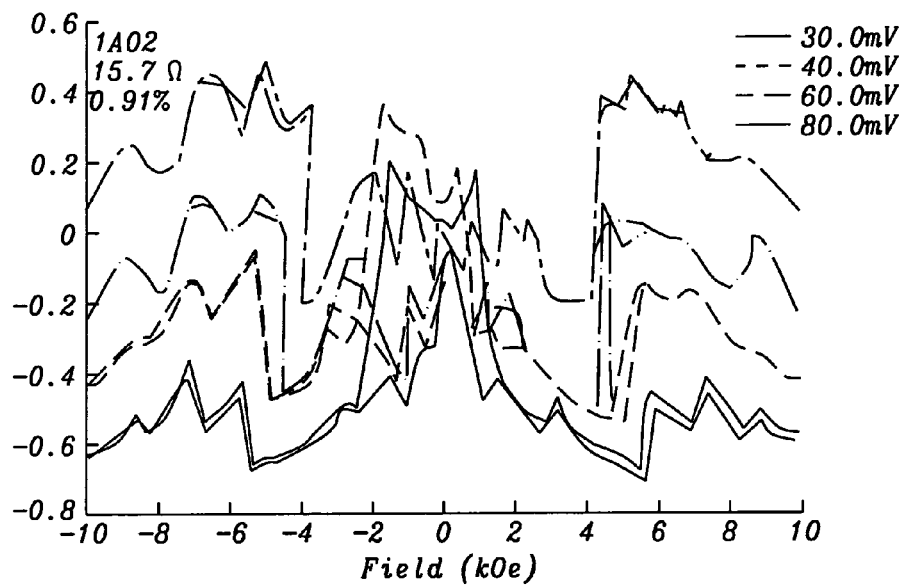
FIGS. 5a through 5d show experimental results for STO TC when a partial anisotropy FGL is inserted at the wrong location.
Figure 5B:
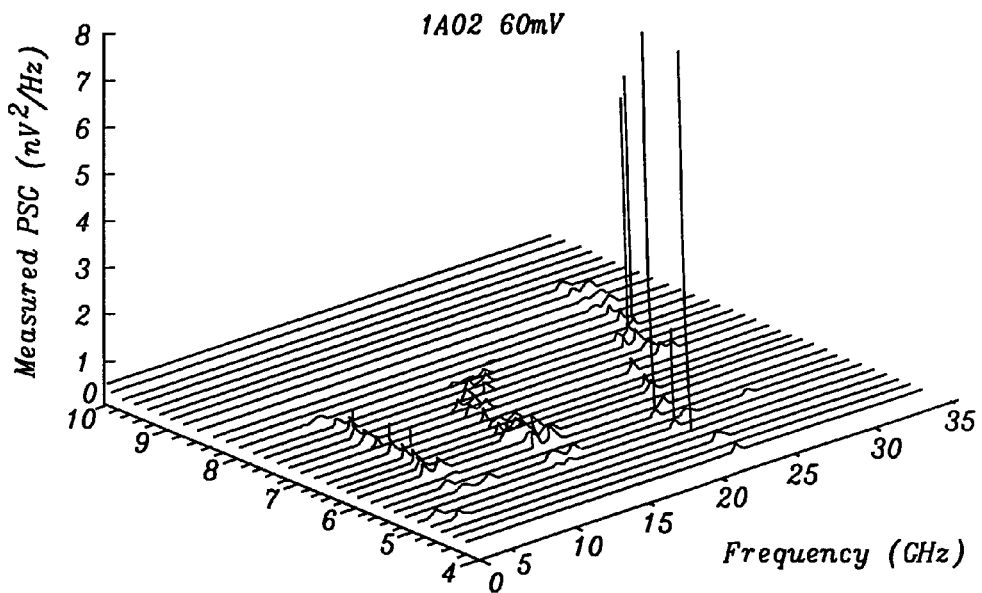
Figure 5C:
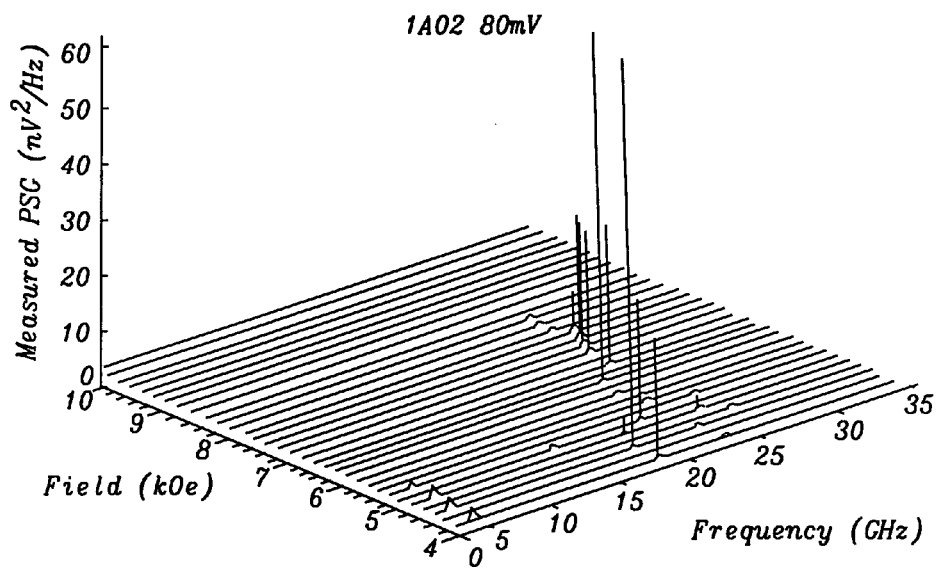
Figure 5D:
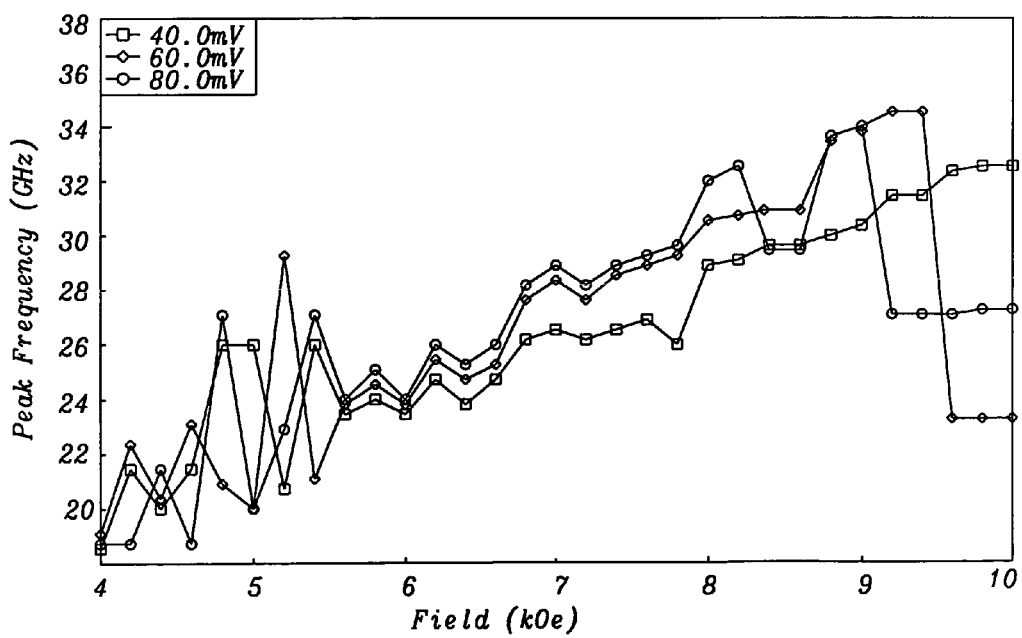

FIG. 4a shows the desired strong oscillation features, including large dR rise, starting from a bias voltage as low as 30 my. FIGS. 4b and 4c confirm that high Q Ferromagnetic Resonance (FMR) at frequencies as high as 35 GHz has been achieved. FIG. 4d shows the peak FMR frequencies vs applied field for different bias voltages. It can be seen that, with the assistance of the PMA (from [Fe(50%)Co2/Ni6]-FGL1), high quality total FGL oscillations were obtained.

For comparison purposes, we also built an STO device having the prior art structure in which FGL1-[Co(50%)Fe2/Ni6]x10 was placed on top of FGL2-FeCo100. As follows:

Ta10/Ru20/Cu20/[Co(50%)Fe2/Ni5]x15/Cu20/Fe(70%)Co100/[Co(50%)Fe2/Ni5]x10/Ru10/Ta40/Ru30

In this case, as discussed above, the spin torque from the SIL layer-[Co(50%)Fe2/Ni5]x15 is largely canceled by the FGL1 layer-[Co(50%)Fe2/Ni5]x10, so the total spin torque acting on the FGL of Fe(70%)Co100/[Co(50%)Fe2/Ni5]x10 is very small. As a result, the oscillation properties are very poor, as shown in FIGS. 5a-5d.

Example 2

On Top [CoFe/Ni]xn at Bottom [CoFe/Ni]xm Coupled with FeCo as FGL

As a preferred embodiment, a top type (SIL layer on the top) structure with the following configuration was fabricated. Each value next to the individual layer indicates the film thickness in angstroms.

Ta10/Ru20/Cu20/FeCo100/[CoFe(x %)2/Ni5]xm/spacer/[CoFe(x %)2/Ni5]xn/Ru10/Ta4 0/Ru30

In the above structure, [CoFe(x %)2/Ni5]xm (with m ranging from 5 to 30 with a preferred range of 5 to 20) is inserted on top of the FeCo100 layer, since the [CoFe/Ni]xm layer is magnetic coupled with FeCo layer strongly, the strong PMA of the [CoFe(x %)2/Ni5]xm will force the anisotropy of the FeCo to tilt partially toward perpendicular direction whereby the full FGL was able to oscillate at current densities as low as $1 \times 10^8$ A/cm$^2$.

Similar data for the bottom STO case was also achieved.

In summary, when the FGL layer next to the spacer has high PMA, better device performance results due to easier FGL oscillations at low current density.

General Comments on Dimensions, Possible Material Substitutions, Etc:

Seed layer thickness should fall within the following ranges (in Angstroms): Ta from 5 to 50; Ru from 5 to 100; Cu from 0 to 100 (in some cases Cu can be completely removed with only Ta/Ru as seed layers).

For [CoFe(x %)(t1)/Ni(t2)]xn multilayer structures, t1 of the Co layer can vary from 0.5 to 5 Å with a preferred range of 1.5 to 3 Å; t2 of Ni layer can range from 2 to 10 Å a with a preferred range of 3.5 to 8 Å; x in CoFe(x %) may range from 0 (pure Co case) to 90; for n in [CoFe(x) t1/Ni(t2)]xn, n may range 5 to 50 with a preferred range of 10 to 30. The spacer material may be Cu for CPP-GMR or MgO, AlOx, TiOx, or ZnO for TMR. A FeCo layer of 50 to 300 Å is suitable for as the FGL layer. Ru10/Ta40/Ru30 is used as the capping layer and an annealing temperature for such devices may range from 150 to 300° C. with a preferred range of 180 to 250° C.; annealing may be from 0.5 hours to 5 hours.

Inside the composite seed layer material: (Ta/Ru/Cu), Cu can be replaced by Ti, Pd, W, Rh, Au, Ag etc having thicknesses in a range of from 1 to 100 Å. The Ta/Ru/Cu composite seed layer can also be replaced by Ta/Ru with Ta thickness ranging from 5 to 50 Å and Ru ranging from 20 to 100 Å; Ta/Ru/Cu can also be replaced with Ta/Cu or Ta/NiCr with Ta ranging from 5 to 50 Å and Cu ranging from 20 to 50 Å or with NiCr ranging from 40 to 100 Å.

The [CoFe(x %)(t1)/Ni(t2)]xn systems can also be replaced by [CoFe(x %)(t1)/Pt(t2)]xn or [CoFe(x %)(t1)/Pd(t2)]xn or [CoFe(x %)(t1)/Ir(t2)]xn or other PMA systems such as CoPt, FePt, CoPd, FePd, TbFe(Co) etc.

What is claimed is:

1. A method to enable a spin torque oscillator (STO) to generate microwaves at low current densities, near a perpendicular write pole, comprising:
    providing a non-magnetic spacer layer having parallel opposing first and second outer surfaces;
    disposing a field generation layer (FGL) to be in contact with said first outer surface, said FGL being a bilayer of first and second FGL sub-layers;
    said first FGL sub-layer being in full contact with said first outer surface as well as having an easy axis that is normal to said first outer surface;
    said second FGL sub-layer being in full contact with said first FGL sub-layer as well as having an easy axis that is parallel to said second outer surface; and
    disposing a spin injection layer (SIL) to be in full contact with said second outer surface as well as being permanently magnetized normal to said first and second outer surfaces, thereby enabling said STO to generate microwave radiation at low current densities.

2. The method recited in claim 1 wherein said low current densities are in a range of from $5 \times 10^7$ A/cm$^2$ to $5 \times 10^8$ A/cm$^2$.

3. The method of claim 2 wherein ferromagnetic resonance occurs in said STO at frequencies in excess of 30 GHz.

4. The method recited in claim 1 wherein said FGL lies between said SIL and said write pole whereby said STO is a top SIL device.

5. The method recited in claim 1 wherein said SIL lies between said FGL and said write pole whereby said STO is a bottom SIL device.

6. A spin torque oscillator (STO) able to generate microwaves at low current densities, near a perpendicular write pole, comprising:
    a non-magnetic spacer layer having parallel opposing first and second outer surfaces;
    a field generation layer (FGL) disposed to be in contact with said first outer surface, said FGL being a bilayer of first and second FGL sub-layers;
    said first FGL sub-layer being in full contact with said first outer surface as well as having an easy axis that is normal to said first outer surface;
    said second FGL sub-layer being in full contact with said first FGL sub-layer as well as having an easy axis that is parallel to said second outer surface; and
    a spin injection layer (SIL) that is in full contact with said second outer surface as well as being permanently magnetized normal to said first and second outer surfaces, whereby said STO is able to generate microwave radiation at low current densities.

7. The STO described in claim 6 wherein said low current densities are in a range of from $5 \times 10^7$ A/cm$^2$ to $5 \times 10^8$ A/cm$^2$.

8. The STO described in claim 6 wherein ferromagnetic resonance occurs at frequencies in excess of 30 GHz.

9. The STO described in claim 6 wherein said FGL lies between said SIL and said write pole whereby said STO is a top SIL device.

10. The STO described in claim 6 wherein said SIL lies between said FGL and said write pole whereby said STO is a bottom SIL device.

11. The STO described in claim 6 wherein said non-magnetic spacer is selected from the group consisting of Cu, MgO, AlOx, TiOx, ZnO and current confining paths (CCP) such as Cu/CCP(such as AlCu/PIT/IAO etc)/Cu or Cu/ZnO/Cu etc.

12. A bottom spin injection layer (SIL) spin torque oscillator (STO), comprising:
    a seed layer of Cu on Ru on Ta;
    a first multilayer structure on said seed layer, said first multilayer structure further comprising t1 Å of Ni on t2 Å of $Co_{100-x}Fe_x$, repeated n times;
    a non-magnetic spacer layer on said first multilayer structure;
    a second multilayer structure on said non-magnetic spacer layer, said second multilayer structure further comprising t3 Å of Ni on t4 Å of $Co_{100-y}Fe_y$, repeated m times;
    a layer of FeCo on said second multilayer structure; and
    on said layer of FeCo, a capping layer of Ru on Ta on Ru.

13. The bottom SIL STO described in claim 12 wherein, for said seed layer, said Ta layer has a thickness ranging from 5 to 50 Å, said Ru layer has a thickness ranging from 5 to 100 Å, and said Cu layer has a thickness ranging from 0 to 100 Å.

14. The bottom SIL STO described in claim 12 wherein, for said multi-layer structures, said t2 or t4 thickness of each $Co_{100-x}Fe_x$ layer is in a range of from 1.5 to 3 Å, said t1 or t3 thickness of Ni is in a range of from 3.5 to 8 Å, and x in said $Co_{100-x}Fe_x$ formulation, is in a range of from 0 to 90%.

15. The bottom SIL STO described in claim 12 wherein, for said multi-layer structures, said t2 or t4 thickness of each $Co_{100-x}Fe_x$ layer is in a range of from 0.5 to 5 Å, said t1 or t3 thickness of Ni is in a range of from 2 to 10 Å, and x in said $Co_{100-x}Fe_x$ formulation, is in a range of from 0 to 90%.

16. The bottom SIL STO described in claim 12 wherein n or m, the number of times said Ni on $Co_{100-x}Fe_x$ formulations may be repeated ranges from 10 to 30.

17. The bottom SIL STO described in claim 12 wherein n or m, the number of times said Ni on $Co_{100-x}Fe_x$ formulations may be repeated ranges from 5 to 50.

18. The bottom SIL STO described in claim 12 wherein, Ni in said [Ni on $Co_{100-x}Fe_x$] formulation may be replaced by a material selected from the group consisting of Pt, Pd, Ir, CoPt, FePt, CoPd, FePd, TbFe, and TbCo.

19. A top spin injection layer (SIL) spin torque oscillator (STO), comprising:
    a seed layer of Cu on Ru on Ta;
    a layer of FeCo on said seed layer;
    a first multilayer structure on said FeCo layer, said first multilayer structure further comprising t1 Å of Ni on t2 Å of $Co_{100-x}Fe_x$, repeated n times;
    a non-magnetic spacer layer on said first multilayer structure;
    a second multilayer structure on said non-magnetic spacer layer, said second multilayer structure further comprising t3 Å of Ni on t4 Å of $Co_{100-y}Fe_y$, repeated m times; and
    a trilayer of Ru on Ta on Ru on said second multilayer structure.

* * * * *